Aug. 3, 1943.  L. E. WALTHER  2,325,722
ELECTRIC WATER HEATER
Filed June 9, 1941  2 Sheets-Sheet 1

INVENTOR:
LUCIAN E. WALTHER,
BY
ATTORNEY

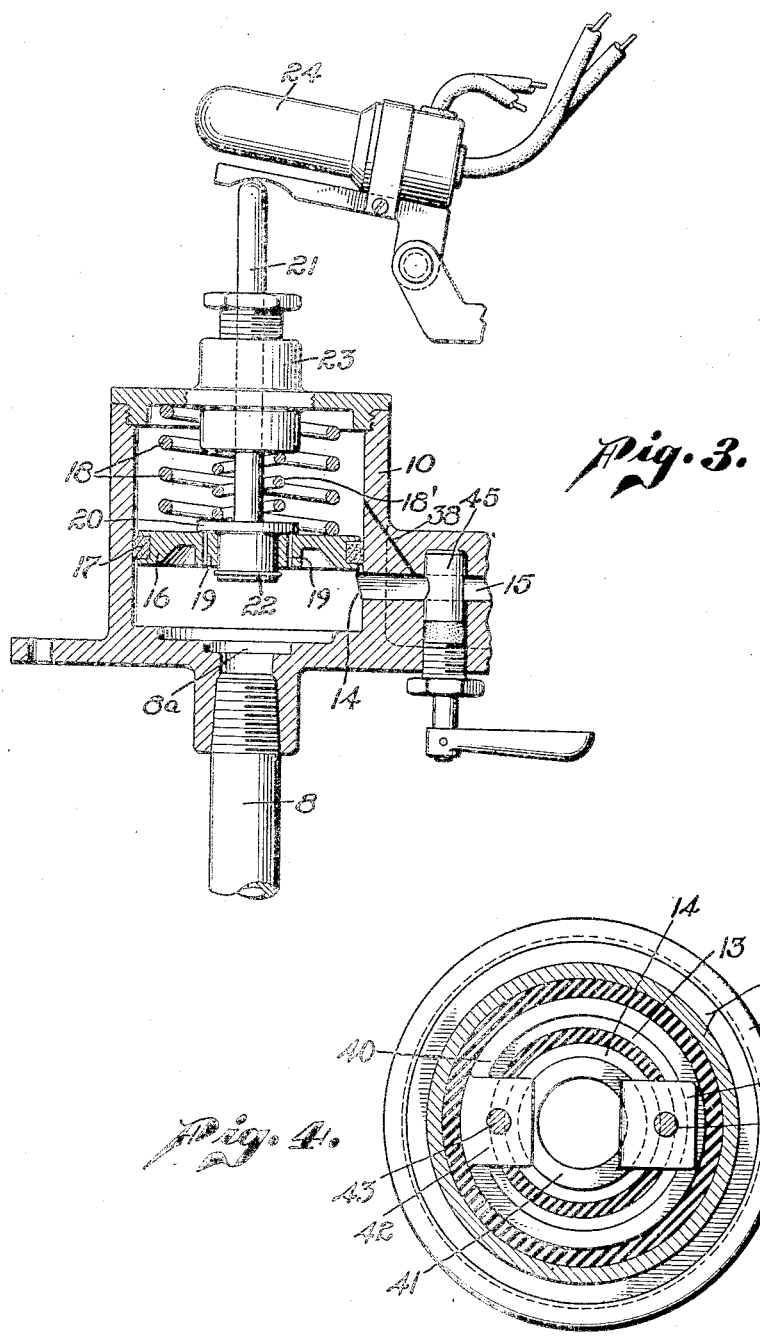

_Patented Aug. 3, 1943_

2,325,722

UNITED STATES PATENT OFFICE 2,325,722

ELECTRIC WATER HEATER

Lucian E. Walther, Del Mar, Calif., assignor of one-half to Albert Crane, Hollywood, Calif.

Application June 9, 1941, Serial No. 397,267

11 Claims. (Cl. 219—39)

This invention relates to water heaters, and more particularly to heaters in which the water is heated by the passage of current therethrough.

Water heaters of the type commonly known in the trade as "instant" water heaters, are intended to heat the water as it passes through the heater, whence it is discharged directly to the point of use, without the intermediacy of a storage tank. These heaters are intended to operate only when water is flowing through them, and, inasmuch as the rate of heat transfer is, in consequence, quite high, it is necessary, for the sake of safety, that they be provided with means to prevent the generation of heat during periods of no flow. Heaters of this type must also be provided with means to prevent the generation of steam, to protect the apparatus and also to avoid danger of scalds and burns to users of the apparatus. To the same end, it is also desirable to provide means which will cause the device to discontinue the application of heat immediately upon generation of steam, independently of the rate of flow, if through some mishap, steam is generated at a rate of flow which normally would not cause such generation.

Water heaters involving electrodes immersed in the water being heated give rise to a number of problems because of the electrolytic action of the current flowing through the water, and it is therefore essential to protect the metallic parts of the apparatus from the electrolytic action of the current. Another problem arising in the operation of heaters of this type is the maintenance of efficiency at a reasonable value. At the same time, it is desirable to provide a device which maintains a satisfactory outlet temperature over a considerable range of flow.

With the above considerations in mind, it is an object of the present invention to provide an electrical water heater which will not permit the generation of steam.

It is a further object of the present invention to provide an electrical water heater which will shut off automatically upon generation of steam in the heating chamber.

It is a further object of the present invention to provide a device which will utilize electrical energy flowing through the water without endangering the equipment by electrolytic action.

It is a further object of the present invention to provide a water heater of the type described which will have a satisfactory range of delivery temperatures regardless of the rate of flow.

It is a further object of the present invention to provide a water heater which will introduce a turbulent flow in the water flowing through the heating chamber.

It is a further object of the present invention to provide a water heater which can be adjusted after installation to deliver water at a predetermined temperature.

It is a further object of the present invention to provide a water heater which will automatically shut off the heat upon reaching a minimum delivery, and will not again operate until the flow has been increased beyond that minimum.

It is a further object of this invention to provide a heater which will not cause water hammer.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawings:

Figure 3 is a fragmentary section, similar to portions of Figure 1 showing the parts in a different position of operation; and, Figure 4 is a section taken on line 4—4 of Figure 1.

Figure 1:
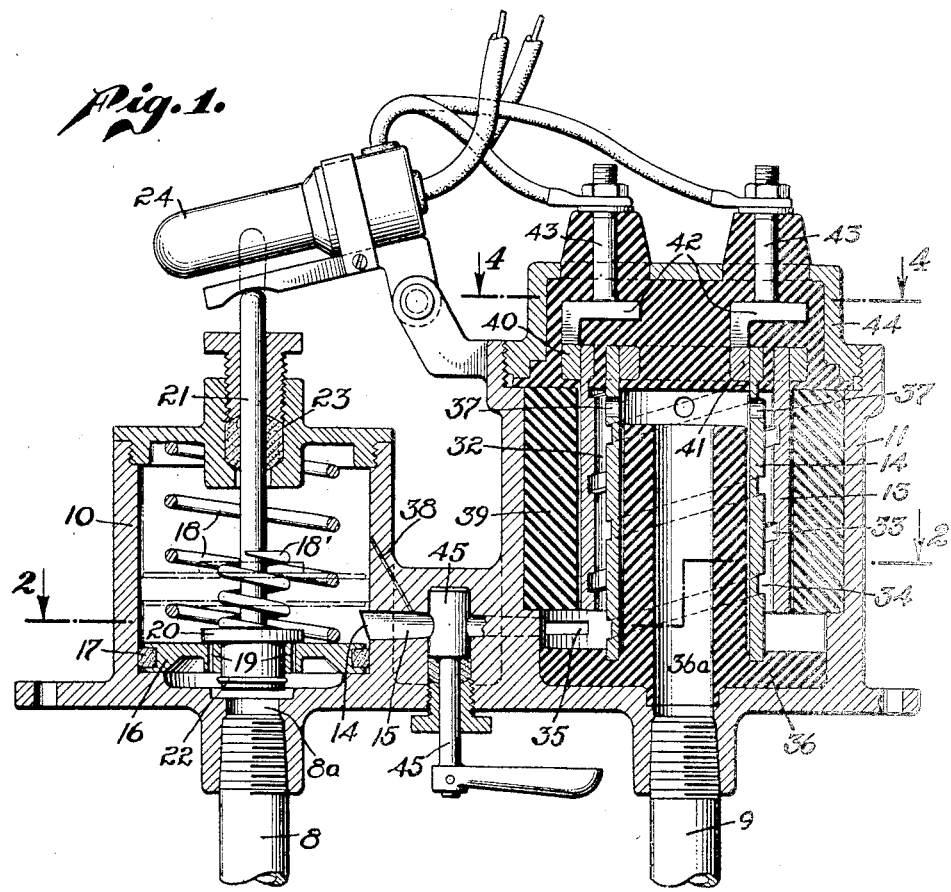
Figure 1 is a vertical sectional view of a device embodying the present invention.

The shown device comprises a pair of intercommunicating chambers 10 and 11, the chamber 10 containing flow and pressure actuated mechanism which in turn controls by a switch or rheostat the supply of current to heating electrodes 13 and 14 contained in the chamber 11. As best seen from Figure 1, fluid enters the chamber 10 from the water supply pipe 8, passes therefrom through the passage 15 to the chamber 11, where it is heated by passage of current through the water as the water flows between the electrodes. The heated water is thence delivered through the pipe 9 to the point of utilization.

Within the chamber 10 is a piston 16, mounted for reciprocating movement, said piston being provided with a packing ring 17 to establish a seal with the walls of the chamber 10. As will be noted in Figure 1, the piston, in its lowermost position, rests on an annular seat at the bottom of the chamber, between the inlet 8a and the outlet mouth 14, and water cannot flow through the chamber 10 without raising the piston. A spring 18, extending between the top of the chamber 10 and the upper surface of the piston 16 forces the piston 16 downwardly, but permits upward movement of the piston when water flows through the heater.

The outlet mouth 14 of the passage 15 is preferably in the form of an inverted triangle. With this shape, the upward movement of piston 16 to permit flow through the passage 15 will result in a gradual opening of the passage. This, and the gradual closing which accompanies downward movement of the piston, prevents the piston from causing a water hammer, which would be destructive to the equipment.

The movement of the piston 16 is used to actuate a valve on the piston itself, and also to turn on and off an electric switch which is connected in the heating circuit. The mechanism for accomplishing these results comprises a series of ports 19 extending through the piston, a valve disc 20, and a switch actuating rod 21 connected to the valve disc. The ports permit flow between the two chambers defined in the chamber 10 by the piston, and the disc 20 is mounted on the rod 21 to cover the ports 19. The rod 21 is mounted for limited axial movement on the piston 16 to permit the disc 20 to lift from the ports 19, and a retaining ring 22 is mounted on its lower end to cause the rod 21 to follow the piston when it moves downwardly. This rod 21 extends through a conventional stuffing box 23, and actuates a mercury switch 24 (or rheostat), to close the heating circuit when the piston is in the position shown in Figure 1, and to open the circuit when the piston is in the position shown in Figure 3. Within the spring 18 is a smaller spring 18', intended to engage the disc 20 and the lower side of the stuffing box 23 when the piston is in the position shown in Figure 3.

The operation of the switch control mechanism should now be clear. Assuming that there is a clear passage from the outlet mouth 14 to the faucet to be supplied with hot water, opening of the faucet in the line 9 causes a reduction in pressure in the upper part of the chamber 10 as the water flows through the passage 15. The pressure from the supply pipe 8 immediately forces the piston 16 upwardly against the tension of the spring 18. When the packing 17 of the piston 16 passes the lower portion of the outlet mouth 14 of the passage 15, water can flow from the chamber beneath the piston through the passage 15 and thence past the heating elements 13 and 14 to the faucet. The piston 16, however, continues to move upwardly until it reaches the position shown in Figure 3. In this position, the disc 20 will be engaged by the spring 18', which holds the disc against the piston and thus closes the ports 19. The switch 24 is so arranged that it closes the heating circuit immediately after the piston unmasks the lower portion of the mouth 14 of the passage 15.

If the faucet then be closed, the momentary increase in pressure in the lower part of the chamber 10 will cause a slight relative movement between the piston 16 and the valve disc 20, permitting the fluid to flow through the piston ports 19. When this happens, the pressures above and below the piston become equalized and the spring 18 can then force the piston downwardly. Upon downward movement of the piston, the switch 24 will be opened. This downward movement also occurs in the event that steam is generated in the heating chamber 11 and causes a momentary increase in the pressure in the lower part of the chamber 10. When the piston moves downwardly, it will pull the rod 21 down with it by means of its retaining ring 22 thus leaving the ports 19 open. There can thus be a limited flow through the ports 19 without closing the switch 24, but as soon as this flow reaches a certain value, the pressure on the lower side of piston 16 will lift it against the disc 20 and close the ports 19. When this occurs, the continued flow of the water will lift the piston 16 and cause the above described cycle of operations to take place.

The erratic pressure which is often present in the line, and possibly generated by the water passing through the heating unit, introduces a fluttering in the piston rod, producing an uneven action of the switch or control 24. For this reason, a very small opening 38 is provided between the passage 15 and the upper part of the chamber 10. This opening, which is smaller in cross-section than any other opening in the system, has a steadying effect on the piston when it is in its uppermost position, but does not affect the action of the device as a whole under major changes of pressure generated by the opening or closing of the faucet or the generation of steam in the heating unit.

As was mentioned before, the chamber 11 contains electrodes 13 and 14 for causing passage of current through the water being heated. This chamber has been arranged to promote a swirling and turbulent flow in the water passing between the electrodes and to protect the metal of which the chamber is made from electrolysis. This turbulence may be promoted by any suitable means, but in the present instance is promoted by providing a comparatively restricted helical path for the water passing between the electrodes, which is done by providing helical grooves in the adjacent surfaces of the electrodes themselves.

Figure 2:
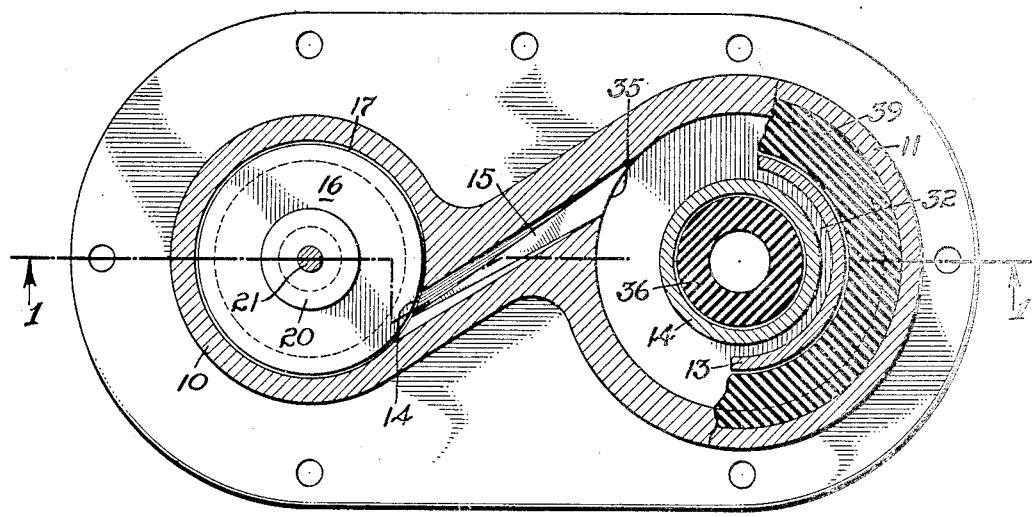
Figure 2 is a horizontal section taken on line 2—2 of Figure 1.

These electrodes are in the form of two cylindrical members manufactured of graphite, carbon or other suitable conducting material. If desired, they may take the form of a resistance coil, provided with a passage as described. They are shown as being concentrically mounted, the outer electrode 13 and the inner electrode 14 defining a restricted passage 32 between the electrodes. The outer surface of the inner electrode 14 is provided with helical grooves 34 and the inner surface of the outer electrode 13 is provided with similar helical grooves 33. It can be readily seen that water flowing in an upward direction through the space 32 will be given a rotary motion in a clockwise direction, as seen in Figure 2. This rotary or swirling motion has several important advantages. For example, it causes the water to pass to all sides of the electrodes. If, through accident or otherwise, the electrodes are not concentric, it is most desirable to provide a means which will insure that the water passing up the side on which the electrodes are farther apart will also pass through the side in which the electrodes are closer together, to prevent the development of intense local heating in spots. Also, this swirling action causes more intimate contact between the electrodes and the liquid, and causes a greater rate of heat transfer per unit of electrode area. The ultimate result is the decrease in the size of electrodes needed for a given capacity.

In order to further promote this rotary motion, the passage 15 is made more or less tangential to the inner surface of the chamber 11, and its mouth 35 is restricted compared to the rest of the passage. The mouth 35 therefore acts as a nozzle, and introduces the water to the chamber 11 with high velocity and with a large circular component of motion.

In order to prevent, as much as possible, the electrolytic action above referred to, the chamber 11 is fashioned with insulating material, such as rubber, or other suitable material, forming its major interior surfaces. This rubber lining also forms the supporting means for the electrodes themselves and insulates them from each other. A rubber bushing 36 covers the bottom of the chamber 11 and extends upwardly therefrom. This bushing has a central bore 36a for conducting the water, discharged from the heating passage 32 through the openings 37, to the pipe leading to the point of use. A rubber sleeve 39 covers a major portion of the side walls of the chamber 11, terminating above the discharge mouth 35 of the passage 15. The sleeve 39 and the bushing 36 are formed to closely fit the exterior surface of the outer electrode and the inner surface of the inner electrode respectively, to hold them firmly spaced.

In order to support the electrodes, they are mounted on metallic rings, the outer electrode being mounted in the ring 40 and the inner electrode being mounted around the ring 41. These rings are provided with ears 42, which in turn are provided with studs 43. These studs extend upwardly through a cap 44 which is screwed into the top of the chamber 11, thus forming terminals for the electrical connections. The cap is filled with rubber, or other suitable material, which extends from the rings to the top of the cap, and out through holes therein to surround the protruding portions of the studs. This forms an insulation between the electrodes and the cap itself, and at the same time forms a mechanical support for the rings and electrodes and prevents contact of water on the rings.

In order that the above device function correctly when installed, despite variations in the pressure available at the inlet and the length of pipe between the outlet of the apparatus and the faucet from which water is drawn, it is necessary to provide an adjustment which will cause the piston 16 to lift when a certain predetermined volume of water flows through the heater. This could be done by changing the strength of the spring 18, but such would be a very inconvenient and impractical way of arriving at the correct operation of the device. In the present instance this adjustment has been achieved by installation of an adjustable valve 46 in the passage 15. By adjustment of this valve, the temperature of the water leaving the device can be varied, so that maximum opening of the faucet will not cause the temperature to drop too far, and at the same time this valve 45 can be utilized to change the point of minimum flow at which the piston 16 will be driven upwardly by the water passing through the device. This, of course, is for the purpose of preventing the switch 24 from being closed while the flow through the heater is so small that its temperature would be raised sufficiently to cause the formation of steam.

I claim:

1. A control device responsive to the flow of fluid therethrough comprising, a chamber having an inlet and an outlet therein; a piston in said chamber movable from a position on one side of said outlet between the inlet and outlet to a position on the other side of the outlet, in which latter position fluid can flow from the inlet through the chamber to the outlet; a port through the piston; a valve for closing the port in the piston, operative to open upon decrease in flow through said chamber; and control means responsive to the position of the piston.

2. A control device responsive to flow of fluid therethrough comprising, a chamber having an inlet and an outlet therein; a piston in said chamber movable from a position between said inlet and outlet on one side of said outlet to the position on the other side of said outlet, in which latter position fluid can flow from the inlet through the chamber to the outlet; a port through the piston, combined control actuating and valve means for said port comprising a member adapted to cover said port secured to a rod extending from said piston to the exterior of said chamber; and means exerting a force to drive said piston to the first-mentioned position.

3. A control device responsive to flow of fluid therethrough comprising, a chamber having an inlet and an outlet therein; a piston in said chamber movable from a position between said inlet and outlet on one side of said outlet to the other side of said outlet, in which latter position fluid can flow from the inlet through the chamber to the outlet; a port through said piston; combined control actuating and valve means comprising a member adapted to cover said port secured to a rod extending from said piston to the exterior of said chamber; means exerting a pressure to move said piston to the firstmentioned position, and spring means engaging said port covering member upon movement of said piston to the secondmentioned position.

4. A fluid heater comprising a pair of chambers; a passage interconnecting said chambers; an inlet in one of said chambers and an outlet in the other of said chambers; heating means in the secondmentioned chamber; and control means in the firstmentioned chamber responsive to the cessation of flow of fluid through said secondmentioned chamber and to the formation of vapor therein to cut off the supply of heat to said secondmentioned chamber.

5. A fluid heater comprising a pair of chambers; a passage interconnecting said chambers; an inlet in one of said chambers and an outlet in the other of said chambers; heating means in the secondmentioned chamber; and control means in the firstmentioned chamber responsive to a momentary increase in pressure in the firstmentioned chamber to cut off the supply of heat to said secondmentioned chamber.

6. A fluid heater comprising, a pair of chambers; a passage interconnecting said chambers; an inlet in one of said chambers and an outlet in the other of said chambers; heating means in the second mentioned chamber; control means in the first mentioned chamber comprising a piston having a valved port therethrough, said piston being movable from a position between said inlet and the mouth of the passage to a position on the other side of said mouth; and means responsive to movement of said piston to cut off the supply of heat to the secondmentioned chamber while said piston is in the firstmentioned position.

7. A fluid heater comprising, a pair of chambers; a passage interconnecting said chambers; an inlet in one of said chambers and an outlet in the other of said chambers; heating means in the second mentioned chamber; control means in the firstmentioned chamber comprising a piston having a valved port therethrough and movable in response to flow through the chambers from a position between said inlet and the mouth of the passage to a position on the other side of said mouth; spring means urging said piston toward the first-mentioned position; said valve being operative to open upon momentary increase of pressure in the chambers to thereby permit the piston to travel under the influence of said spring; and means connecting said piston to means cutting off the supply of heat to said second chamber while said piston is in the firstmentioned position.

8. A fluid heater comprising, a pair of chambers; a passage interconnecting said chambers; an inlet in one of said chambers and an outlet in the other of said chambers; a piston in one of said chambers adapted to mask the mouth of the passage during movement; said passage having the mouth in that chamber of triangular configuration, whereby to prevent sudden increase in flow upon unmasking of said mouth.

9. A device for heating fluid electrically comprising; a chamber; a removable closure therefor; a pair of concentric electrodes in said chamber; a pair of rings supporting said electrodes; a terminal connected to each of said rings and passing through said closure; and a body of insulating material surrounding said terminals and said rings and secured to said closure to thereby support and insulate them from each other.

10. An electrolytic heating device comprising a pair of hollow concentric cylindrical electrodes; a casing surrounding said electrodes; means insulating substantially all of the interior of said casing; an outlet from said casing; and an insulating sleeve having its inner bore communicating with said outlet, said sleeve extending through the opening of the inner electrode.

11. An electrolytic heating device comprising a pair of hollow concentric cylindrical electrodes; a casing surrounding said electrodes and having an outlet; a ring within the inner electrode and a ring about the outer electrode, terminals connected to each of said rings; a body of insulating material surrounding said terminals and said rings to thereby support them and insulate them from each other and the casing; means insulating substantially all of the interior of the casing; and an insulating sleeve having its inner bore communicating with said outlet, said outlet extending through the opening of the inner electrode.

LUCIAN E. WALTHER.